Figure 1:
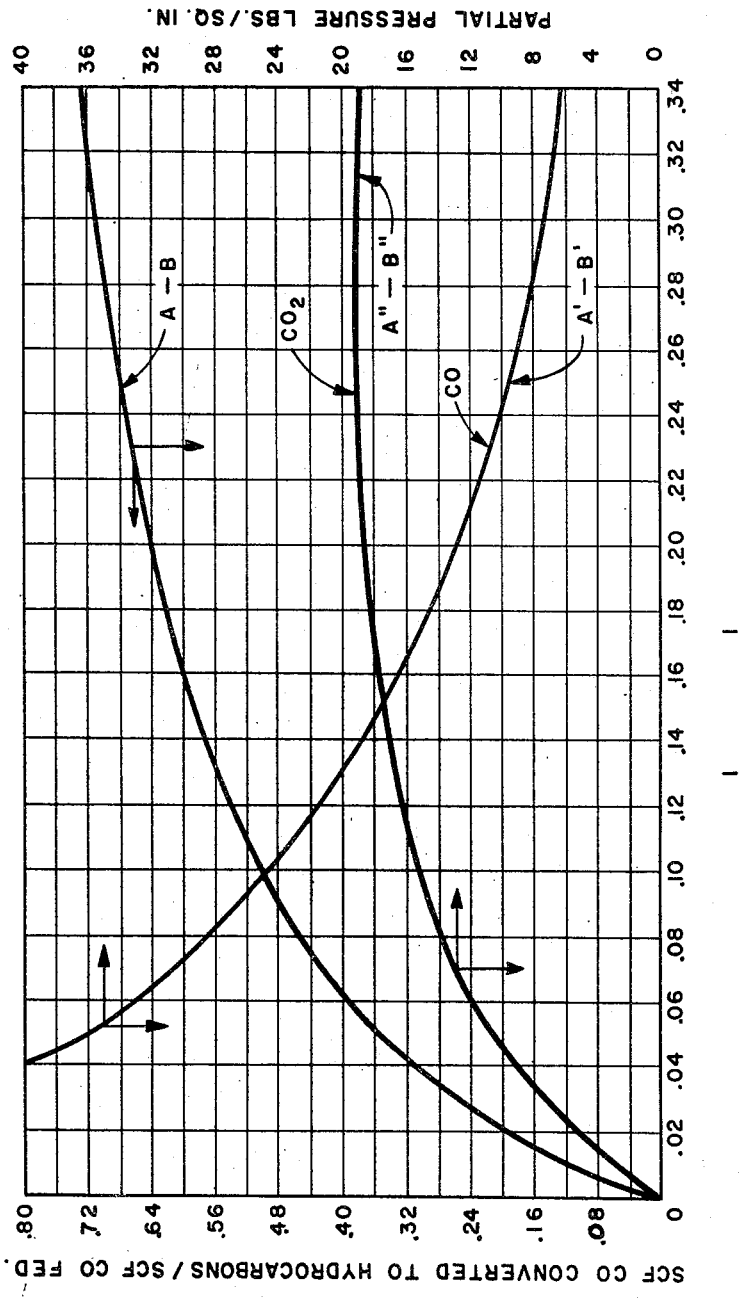

May 6, 1958

C. G. FRYE 2,833,803

METHOD FOR DETERMINING RECYCLE TO
HYDROCARBON SYNTHESIS REACTOR

Filed March 14, 1955

2 Sheets-Sheet 1

INVENTOR.
CLIFTON G. FRYE
BY
ATTORNEY

May 6, 1958

C. G. FRYE 2,833,803

METHOD FOR DETERMINING RECYCLE TO
HYDROCARBON SYNTHESIS REACTOR

Filed March 14, 1955

2 Sheets-Sheet 2

INVENTOR.
CLIFTON G. FRYE

United States Patent Office 2,833,803
Patented May 6, 1958

2,833,803

METHOD FOR DETERMINING RECYCLE TO HYDROCARBON SYNTHESIS REACTOR

Clifton G. Frye, Tulsa, Okla., assignor to Pan American Petroleum Corporation, a corporation of Delaware Application March 14, 1955, Serial No. 493,958

2 Claims. (Cl. 260—449.6)

My invention relates to a novel improvement in the process for synthesizing hydrocarbons from carbon monoxide and hydrogen mixture by subjecting the latter to the action of elevated temperatures and pressures in the presence of a suitable catalyst. More particularly, it is concerned with an improvement in said synthesis whereby the maximum rate of CO conversion to hydrocarbons is secured with fixed conditions of temperature, pressure, fresh feed conversion level, fresh feed composition, fresh feed recycle ratio and catalyst.

In carrying out hydrocarbon synthesis in the conventional manner, a portion of the hot product gas, after condensing out the normally liquid components present therein, is returned to the fresh feed stream as recycle and the resulting mixture (total feed) is injected into the reactor. Thus, where the recycle gas is first mixed with the fresh feed and then injected into the base of a bed of a fluidized catalyst, decreased conversion of the CO to useful products occurs. This result is evident since dilution of the fresh feed gas containing a high percentage of CO and a low percentage of $CO_2$ causes a significant lowering of hydrocarbon synthesis reaction rate. Similarly, if the recycle gas is introduced above the optimum injection point or in the limiting case, completely eliminated, it is apparent that decreased conversion will result since the CO partial pressure above the optimum point at which the recycle gas should be injected will be markedly less. Kinetic analysis of the results obtained in both fluid and fixed bed hydrocarbon synthesis runs shows that the process is largely controlled by the rate of the reaction occurring on the catalyst surface. Such a reaction for any given set of conditions may be represented by the following equation:

$$R = \frac{pCO}{a + bpCO_2} \quad (1)$$

where:

$R$ = rate of carbon conversion to hydrocarbons/lb. iron
$pCO$, $pCO_2$ = partial pressure of CO and $CO_2$ respectively, lb./sq. in.
$a, b$ = constants I have now discovered that in any given hydrocarbon synthesis system, there exists an optimum point for returning recycle gas to the reactor and that such point can be determined by using the above equation. In arriving at the proper point for return or recycle gas to the reactor care should be exercised not to inject such gas into the system at a level which will result in a material reduction in the CO partial pressure above the injection point. On the contrary, with recycle gas from which $CO_2$ has not been removed, I desire to introduce said recycle gas at a level in the reactor such that the concentration of CO at that particular level is at least equal to the CO concentration of the gas in the reaction zone at that level prior to introduction of the recycle stream. Otherwise expressed, the actual level at which the recycle stream should be injected into the reaction zone is the level at which the rate expression $$\left(\frac{pCO}{a + bpCO_2}\right)_f \text{ becomes equal to } \left(\frac{pCO}{a + bpCO_2}\right)_r$$

in which the subscript $f$ refers to the partially converted feed gas and the subscript $r$ indicates the mixed recycle and partially converted feed gases.

Figure 2:
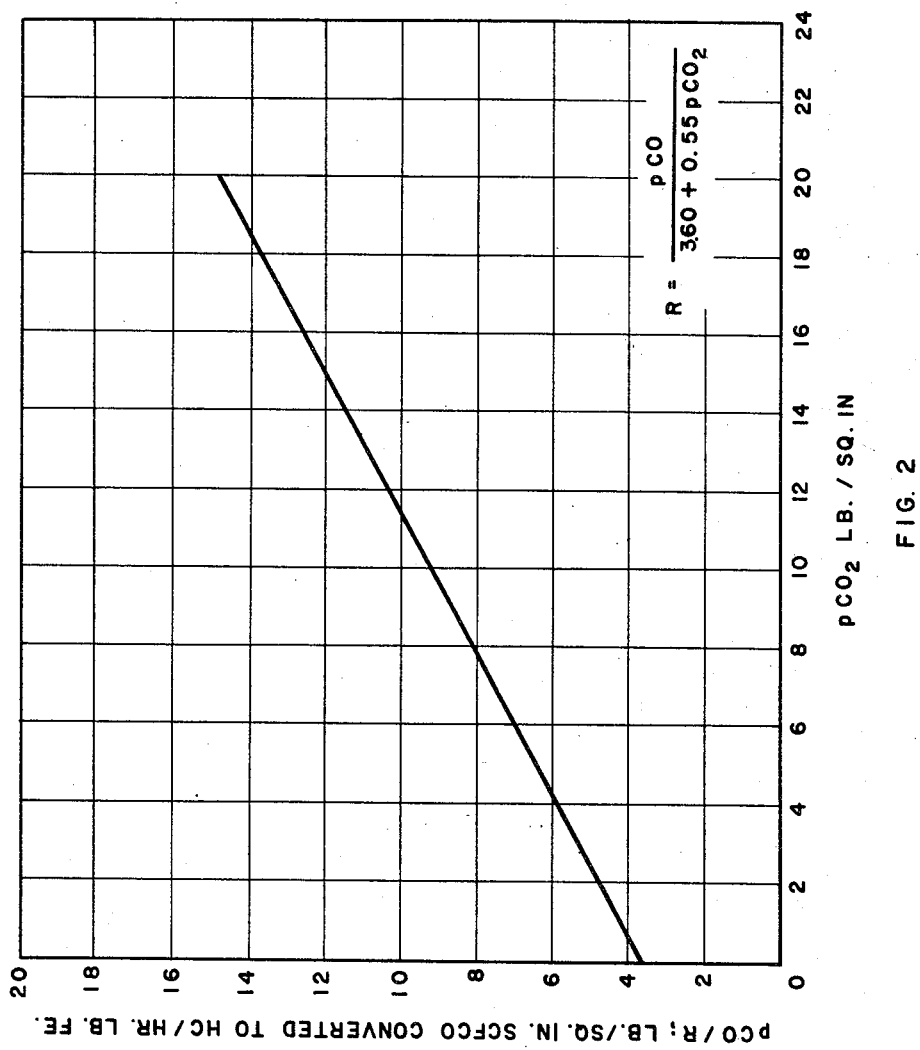

Figure I illustrates the effect of space velocity on partial pressure of CO and $CO_2$ in the reaction zone during hydrocarbon synthesis. Figure 2 is a plot of the relationship of $CO_2$ partial pressure to the quantity of CO converted to hydrocarbons per hour per pound of catalyst.

To further illustrate the application of the principles of my invention to hydrocarbon synthesis operations, reference is made to the following typical hydrocarbon synthesis runs in which the conditions indicated below are employed:

Temperature _____ 630° F.
Pressure _____ 250 p. s. i. g.
Catalyst _____ Iron mill scale.
Feed composition:
    69.2 percent $H_2$
    23.1 percent CO
    4.7 percent $CH_4$
    3.0 percent $N_2$ Under the conditions of operation, the density of catalyst iron fluidized is about 85 pounds per cubic foot. Density of total catalyst fluidized is about 110 pounds per cubic foot. In the first run (A) made, the space velocity is varied by changing the through-put of gas—with no recycle—to the reactor. In a second run (B), the space velocity is changed by varying the amount of catalyst in the reactor. Likewise, no recycle is employed in this run. In a third run (C), the feed gas through-put is controlled so as to give a fresh feed conversion of 85 percent. A recycle ratio of 1.0 is used and recycle gas is injected into the reactor at the various levels of the catalyst bed indicated.

In runs (A) and (B) referred to above, the height of the catalyst bed varies from about 2 to about 10 feet. While in run (C) the average catalyst bed height is about 6 feet. The reactor employed has an internal diameter of 8" and is 20 feet long.

From runs (A) and (B), a single curve A—B is obtained by plotting the ratio of s. c. f. CO converted to hydrocarbons to s. c. f. CO fed against the reciprocal space velocity or $$\frac{1}{\text{s. c. f. h. CO/pound iron}}$$

regardless of whether the gas through-put or amount of catalyst in the reactor is changed. This curve indicates that with increasing reciprocal space velocities at values ranging from about .02 to about 0.10, the ratio of CO converted to hydrocarbons to CO fed to the system increases quite rapidly. Beyond a reciprocal space velocity of 0.1, this ratio begins to decrease gradually until relatively little benefit is gained by employing reciprocal space velocities greater than about 0.15 or 0.20.

Also from curve A—B, the differential rate of hydrocarbon formation can be calculated at varying reciprocal space velocity values. Curves A'—B' and A"—B", respectively, show that with decreasing space velocities, CO partial pressure decreases while the partial pressure of $CO_2$ in the system increases. The rates of reaction in runs A and B are the values of the slope of curve A—B at any given reciprocal space velocity and can be obtained by conventional graphic methods. The rate values thus determined, together with the corresponding CO and $CO_2$ partial pressures, can then be substituted in Equation 1 to ascertain for any given set of operating conditions the values for the constants $a$ and $b$. A tabulation of the required data from runs (A) and (B) appears below. These data may be substituted directly into Equation 1 for evaluation of constants $a$ and $b$.

point that the rate expression [Equation 1] for the partially converted fresh feed gas is equal to the combined fresh feed gas plus recycle gas. Thus, in run (C) which employs a recycle ratio of 1.0, the following results are obtained when operating under the temperature, pressure and other conditions specified above.

Table II

| Case | 1 | 2 | 3 | 4 | 5 | 6 |
|---|---|---|---|---|---|---|
| $\frac{1}{SV(f)}$ | 0.198 | 0.209 | 0.203 | 0.181 | 0.182 | 0.191 |
| Injection of Recycle Gas—Distance Above Grid (feet) | 0 | 2.25 | 3.59 | 5.0 | 5.25 | 6.0 |
| Percent Selectivity: | | | | | | |
| $C_3$+Oil Soluble Chemicals | 51.7 | 52.2 | 53.0 | 52.7 | 52.7 | 49.3 |
| Water Soluble Chemicals | 9.7 | 9.0 | 8.4 | 8.2 | 8.1 | 5.4 |
| Yield (lbs. Carbon/hr./100 lbs. Fe): | | | | | | |
| $C_3$+Oil Soluble Chemicals | 7.03 | 6.72 | 7.10 | 7.84 | 7.78 | 6.93 |
| Water Soluble Chemicals | 1.32 | 1.16 | 1.12 | 1.22 | 1.20 | 0.76 |
| Total | 8.35 | 7.88 | 8.22 | 9.06 | 8.98 | 7.69 |
| Feed Before Recycle: | | | | | | |
| $pCO$, p. s. i. | 61.2 | 28.6 | 21.5 | 17.45 | 16.3 | 13.2 |
| $pCO_2$, p. s. i. | 0 | 13.4 | 16.1 | 17.45 | 17.75 | 18.5 |
| $\frac{pCO}{3.60+0.55pCO_2}$ | 17.0 | 2.61 | 1.73 | 1.32 | 1.22 | 0.958 |
| Recycle Gas: | | | | | | |
| $pCO$, p. s. i. | 17.3 | 17.1 | 17.0 | 16.8 | 16.7 | 16.2 |
| $pCO_2$, p. s. i. | 15.6 | 16.1 | 16.7 | 17.3 | 17.6 | 21.6 |
| Feed After Recycle: | | | | | | |
| $pCO$ | 39.25 | 22.2 | 18.9 | 17.08 | 16.53 | 14.95 |
| $pCO_2$ | 7.8 | 14.9 | 16.4 | 17.35 | 17.65 | 20.3 |
| $\frac{pCO}{3.60+0.55pCO_2}$ | 4.98 | 1.88 | 1.485 | 1.30 | 1.24 | 1.01 |

Table I

| 1/SV | $pCO$ | $pCO_2$ | R (reaction rate) | $pCO/R$ |
|---|---|---|---|---|
| .04 | 40.2 | 9.0 | 4.70 | 8.56 |
| .06 | 33.5 | 11.3 | 3.36 | 9.98 |
| .08 | 28.6 | 13.4 | 2.60 | 11.00 |
| .14 | 18.7 | 17.2 | 1.40 | 13.37 |
| .20 | 12.6 | 18.7 | 0.91 | 13.85 |
| .24 | 10.0 | 19.2 | 0.70 | 14.28 |
| .28 | 8.00 | 19.1 | 0.55 | 14.55 |

By plotting $pCO/R$ against $pCO_2$, as shown in Figure 2, a straight line relationship is obtained proving the validity of Equation 1 thereby permitting a direct evaluation of constants $a$ and $b$. The constant $a$ is a numerically equal to the intercept at $pCO_2=0$. From Figure 2, it is seen that this value is 3.60. Similarly, the value for the constant $b$ is numerically equal to the slope of the line in Figure 2 which in this case is 0.55. It will be appreciated, as discussed above, that the reaction rate for such a system may also be determined algebraically using two of the points employed in making the line in Figure 2. However, because of the higher degree of accuracy obtainable by securing the reaction rate equation directly from the plot, I generally prefer this method. Accordingly, from the above calculations, the final equation for runs (A) and (B) may be written as follows:

$$R = \frac{pCO}{3.60 + 0.55 pCO_2} \quad (2)$$

The line in Figure 2 graphically illustrates the relationship expressed in Equation 2.

In connection with Equation 2, it is to be pointed out that the constants $a$ and $b$ will vary with the particular catalyst under investigation. In the specific case described in connection with Equation 2, the values $a$ and $b$ are for mill scale catalyst. For any given catalyst, the values of these constants are determined in a manner identical with that related in the paragraph immediately above. Also, it should be noted that for a given catalyst the constants $a$ and $b$ will vary with the operating conditions, e. g., temperature.

Where a recycle gas stream is employed, Equation 2 indicates that the maximum rate of formation of useful products is secured by injection of said stream at such a point that the rate expression [Equation 1] for the partially converted fresh feed gas is equal to the combined fresh feed gas plus recycle gas. Thus, in run (C) which employs a recycle ratio of 1.0, the following results are obtained when operating under the temperature, pressure and other conditions specified above.

As previously pointed out, it is desirable to inject the recycle gas at the point where the maximum rate of formation of useful products occurs. Examining the data in Table I with this thought in mind, we find that the maximum yield of total useful products produced under the conditions of operation is obtained when the recycle stream is injected into the catalyst bed at a point about 5 feet above the base of said bed. It is also to be stressed that the level at which the recycle stream is returned to the reactor for maximum yield of useful products can be ascertained by applying Equation 2 to the fresh feed plus recycle gas. The optimum point of recycle return then is determined by the level in the catalyst bed at which the reaction rates before and after recycle are substantially equal. Thus, we observe from the reaction rates listed in Table I, that the rate before recycle at a height of 5.25 feet above the grid is slightly less than the reaction rate at the same level with recycle. Since at 5 feet above the grid the reaction rate prior to recycle is greater than that at the same level after recycle, we know that the optimum point of recycle return must lie between these two levels. This conclusion is confirmed through experimental results shown in Table II under "Total yield" of useful products obtained by returning the recycle stream at bed levels of 5 feet and 5.25 feet.

With systems in which a relatively low total pressure is employed, the quantity $bpCO_2$ in Equation 1 becomes negligible and may be disregarded. Under these circumstances, recycle should be performed in a manner such that the CO partial pressure in the fresh feed gas becomes equal to the CO partial pressure in the combined gas, i. e., partially converted fresh feed plus recycle gas. On the other hand, in instances where the $CO_2$ has been removed from the recycle stream and the latter is injected into a high pressure system, it is evident that the optimum point of recycle will be at a level in the bed considerably lower than when the normal concentration of $CO_2$ is present in the recycle gas. This results because of the decrease in the value of the quantity $bpCO_2$ in the combined gas stream.

From the foregoing description, it will be appreciated that a novel concept in the hydrocarbon synthesis art has been taught. As a result of such description, numerous modifications involving the principles disclosed and claimed herein will occur to those skilled in the art. It is to be strictly understood, therefore, that any such modifications or combination of the above-mentioned principles are to be considered as lying within the scope of my invention as claimed.

I claim:
1. In a process for the synthesis of hydrocarbons by the reduction of CO with hydrogen in a reaction zone and in the presence of a relatively dense fluidized bed of catalyst under known operating conditions wherein the resulting product gas is subjected to a cooling step and a portion of the normally gaseous fraction obtained from said step is recycled back to the stream of CO and hydrogen prior to injection of said stream into said zone, the improvement which comprises returning said portion of the normally gaseous fraction to said bed at a level therein at which the rate expression

$$\left(\frac{pCO}{a+bpCO_2}\right)_f$$

becomes equal to the rate expression $$\left(\frac{pCO}{a+bpCO_2}\right)_r$$

wherein $f$ refers to the partially converted fresh feed gas and $r$ represents the mixture of recycle and partially converted fresh feed gas, $pCO$ and $pCO_2$ are partial pressures of CO and $CO_2$, respectively, $a$ is a constant representing the intercept of a line with the ordinate axis and $b$ represents the slope of said line, said line having been obtained by plotting $$\frac{pCO}{R} \text{(ordinate)}$$

against $pCO_2$ where R is the reaction rate and is equal to the expression $$\frac{pCO}{a+bpCO_2}$$

R having been determined by establishing the slope of a curve at any given point, said curve having been obtained by plotting as the ordinate s. c. f. CO converted to hydrocarbons per s. c. f. CO fed against the reciprocal of the space velocity employed.

2. In a process for the synthesis of hydrocarbons by the reduction of CO with hydrogen in a reaction zone on in the presence of a relatively dense fluidized bed of catalyst under known operating conditions wherein the resulting product gas is subjected to a cooling step and a portion of the normally gaseous fraction obtained from said step is recycled back to the stream of CO and hydrogen prior to injection of said stream into said zone, the improvement which comprises returning said portion of the normally gaseous fraction to said bed at a level therein at which the CO partial pressure of the gas at said level is equal to the CO partial pressure of the normally gaseous fraction which is recycled to said bed and the quantity $bpCO_2$ at said level is negligible where $b$ is a constant and $pCO_2$ is the partial pressure of $CO_2$ at said level.

References Cited in the file of this patent
UNITED STATES PATENTS

| | | |
|---|---|---|
| 2,580,116 | McGrath et al. | Dec. 25, 1951 |
| 2,700,676 | McGrath | Jan. 25, 1955 |
| 2,708,674 | Mattox et al. | May 17, 1955 |